US012461998B2

United States Patent
Grover et al.

(10) Patent No.: US 12,461,998 B2
(45) Date of Patent: Nov. 4, 2025

(54) USING WATERMARKS TO IDENTIFY A CHAIN OF TITLE IN MEDIA

(71) Applicant: MICRO FOCUS LLC, Santa Clara, CA (US)

(72) Inventors: Douglas Max Grover, Rigby, ID (US); Michael F. Angelo, Houston, TX (US)

(73) Assignee: Micro Focus LLC, Santa Clara, CA (US)

( * ) Notice: Subject to any disclaimer, the term of this patent is extended or adjusted under 35 U.S.C. 154(b) by 23 days.

(21) Appl. No.: 18/228,228

(22) Filed: Jul. 31, 2023

(65) Prior Publication Data

US 2025/0045362 A1    Feb. 6, 2025

(51) Int. Cl.
    G06F 21/10    (2013.01)
    G06F 21/16    (2013.01)
    H04L 9/00     (2022.01)

(52) U.S. Cl.
    CPC ............ G06F 21/108 (2023.08); G06F 21/16 (2013.01); H04L 9/50 (2022.05)

(58) Field of Classification Search
    CPC ........... G06F 21/108; G06F 21/16; H04L 9/50
    See application file for complete search history.

(56) References Cited

U.S. PATENT DOCUMENTS

| 10,789,339 | B1 | 9/2020 | Li |
| 11,062,000 | B2 | 7/2021 | Li |
| 11,550,928 | B2 | 1/2023 | Bengston |
| 2003/0125964 | A1* | 7/2003 | Chang ............... G11B 20/0021 705/51 |
| 2023/0130182 | A1* | 4/2023 | Mir ....................... H04L 9/3297 713/189 |
| 2024/0119128 | A1* | 4/2024 | Li ....................... H04L 63/0435 |

FOREIGN PATENT DOCUMENTS

CN            111090626  A  *  5/2020  ........... G06F 16/172

* cited by examiner

*Primary Examiner* — Linglan Edwards
*Assistant Examiner* — Saron Matthewos Worku
(74) *Attorney, Agent, or Firm* — Sheridan Ross P.C.

(57) ABSTRACT

A watermark is generated. The generated watermark is specific to an individual owner of a media. The media may be any type of electronic media, such as, an image, a document, a movie, an audio file, a software application, and/or the like. The watermark is inserted into the media. The watermark in the media is changed when ownership of the media is changed. For example, as the media is sold to a new owner, the new owner's watermark is added to the media so that a chain of title can be verified directly from the media. In addition, the chain of title may also be verified via a blockchain.

20 Claims, 7 Drawing Sheets

USING WATERMARKS TO IDENTIFY A CHAIN OF TITLE IN MEDIA

FIELD

The disclosure relates generally to media and/or software and particularly to digitally tracking ownership of media using watermarks.

BACKGROUND

Tracking ownership of media (e.g., Non-Fungible Tokens (NFTs)) and/or software is difficult. In addition, with current solutions, the tracking of illegitimate copies of media/software is also difficult because it is often difficult to track where the illegitimate copy came from.

SUMMARY

These and other needs are addressed by the various embodiments and configurations of the present disclosure. The present disclosure can provide a number of advantages depending on the particular configuration. These and other advantages will be apparent from the disclosure contained herein.

A watermark is generated. The generated watermark is specific to an individual owner of a media. The media may be any type of electronic media, such as, an image, a document, a movie, an audio file, a software application, and/or the like. The watermark is inserted into the media. The watermark in the media is changed when ownership of the media is changed. For example, as the media is sold to a new owner, the new owner's watermark is added to the media so that a chain of title can be verified directly from the media. In addition, the chain of title may also be verified via a blockchain.

The phrases "at least one", "one or more", "or," and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate" and "compute," and variations thereof, as used herein, are used interchangeably, and include any type of methodology, process, mathematical operation, or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Farther, the structures, materials or acts and the equivalents thereof shall include all those described in the summary, brief description of the drawings, detailed description, abstract, and claims themselves.

The term "blockchain" as described herein and in the claims refers to a growing list of records, called blocks, which are linked using cryptography. The blockchain is commonly a decentralized, distributed and public digital ledger that is used to record transactions across many computers so that the record cannot be altered retroactively without the alteration of all subsequent blocks and the consensus of the network. Each block contains a cryptographic hash of the previous block, a timestamp, and transaction data (generally represented as a merkle tree root hash). For use as a distributed ledger, a blockchain is typically managed by a peer-to-peer network collectively adhering to a protocol for inter-node communication and validating new blocks. Once recorded, the data in any given block cannot be altered retroactively without alteration of all subsequent blocks, which requires consensus of the network majority. In verifying or validating a block in the blockchain, a hashcash algorithm generally requires the following parameters: a service string, a nonce, and a counter. The service string can be encoded in the block header data structure, and include a version field, the hash of the previous block, the root hash of the merkle tree of all transactions (or information or data) in the block, the current time, and the difficulty level. The nonce can be stored in an extraNonce field, which is stored as the left most leaf node in the merkle tree. The counter parameter is often small at 32-bits so each time it wraps the extraNonce field must be incremented (or otherwise changed) to avoid repeating work. When validating or verifying a block, the hashcash algorithm repeatedly hashes the block header while incrementing the counter & extraNonce fields. Incrementing the extraNonce field entails recomputing the merkle tree, as the transaction or other information is the left most leaf node. The body of the block contains the transactions or other information. These are hashed only indirectly through the Merkle root.

As described herein and in the claims, the term "changed" when referring to a watermark in media may include overwriting an existing watermark, adding an additional watermark, moving a watermark, a combination of these, and/or the like.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Figure 1:
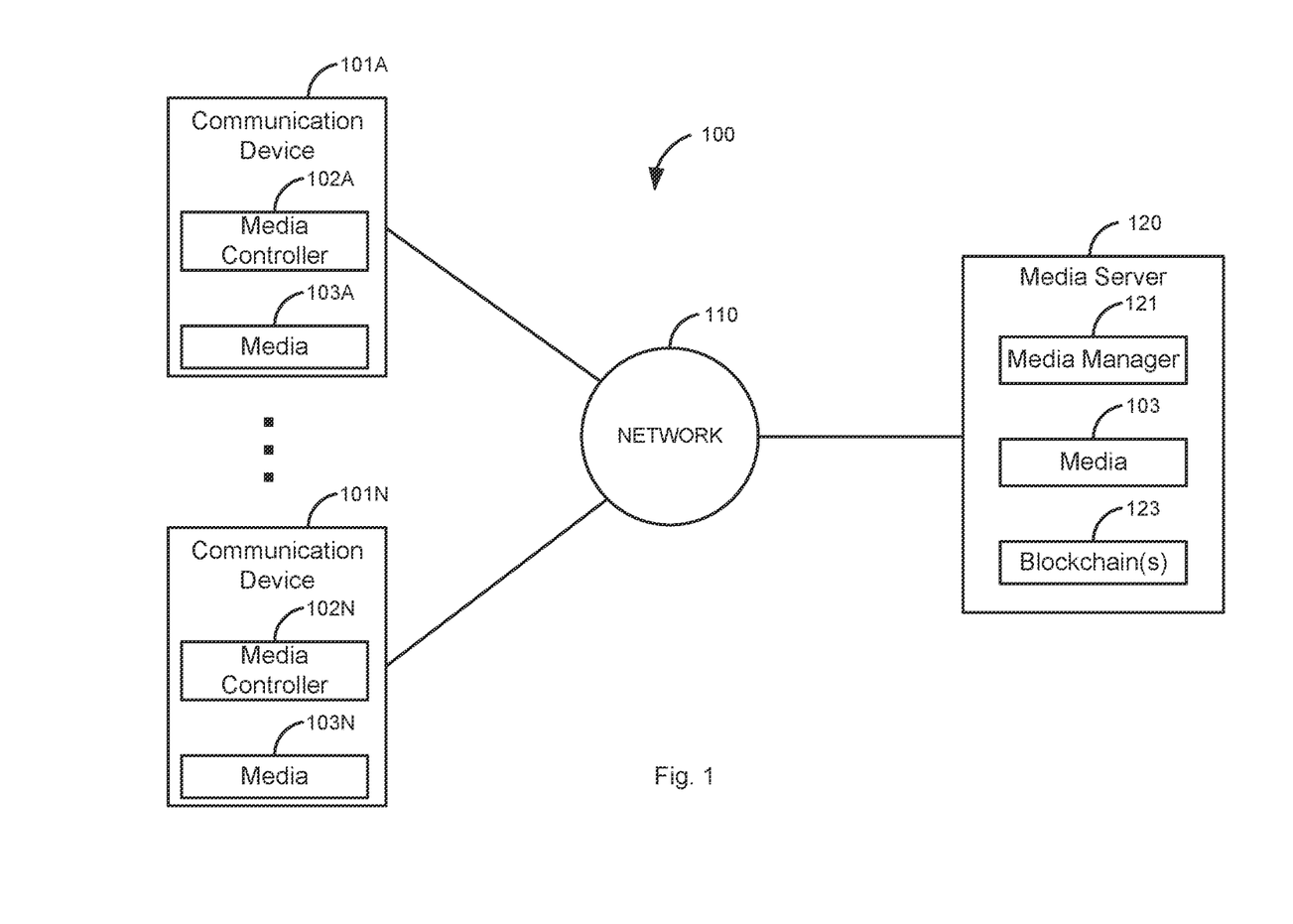
FIG. 1 is a block diagram of a first illustrative system for using watermark(s) and a blockchain to track ownership of media.

FIG. 1 is a block diagram of a first illustrative system 100 for using watermark(s) and a blockchain 123 to track ownership of media 103. The first illustrative system 100 comprises communication devices 101A-101N, a network 110, and a media server 120.

The communication devices 101A-101N can be or may include any device that can communicate on the network 110 that uses media 103, such as a Personal Computer (PC), a telephone, a video system, a cellular telephone, a Personal Digital Assistant (PDA), a tablet device, a notebook device, a smartphone, a server, an embedded device, and/or the like. As shown in FIG. 1, any number of communication devices 101A-101N may be connected to the network 110, including only a single communication device 101.

The communication devices 101A-101N further comprise media controllers 102A-102N, and media 103A-103N. The media controllers 102A-102N are used to manage tracking ownership of the media 103A-103N. For example, if the ownership of the media 103A changes, the media controller 102A will communicate with the media manager 121 so that the media manager 121 can change/track the ownership of the media 103A. If the media 103A has been sold, the media controller 102A may delete the media 103A because the owner of the media 103A may no longer own a valid copy of the media 103A.

The media 103A-103N (103) may include any type of electronic media 103, such as, an NFT, a digital image, a video, an audio stream, a document, computer software, and/or the like.

The network 110 can be or may include any collection of communication equipment that can send and receive electronic communications, such as the Internet, a Wide Area Network (WAN), a Local Area Network (LAN), a packet switched network, a circuit switched network, a cellular network, a combination of these, and the like. The network 110 can use a variety of electronic protocols, such as Ethernet, Internet Protocol (IP), Hyper Text Transfer Protocol (HTTP), Web Real-Time Protocol (Web RTC), and/or the like. Thus, the network 110 is an electronic communication network configured to carry messages via packets and/or circuit switched communications.

The media server 120 can be any communication device 101 that can manage the media 103. The media server 120 can manage various types of media 103, such as audio media, video media, computer software, and/or the like. The media server 120 further comprises the media manager 121, media 103, and blockchain(s) 123.

The media manager 121 is used to track ownership/access of the media 103. The media manager 121 may be used to validate that the media 103 is legitimate or illegitimate. The media manager 121 can track ownership/access of the media 103 in various says, such as, by placing the watermark(s) into the media 103, overwriting existing watermark(s), by moving a watermark in the media, by adding blocks to the blockchain(s) 123, adding links to link the watermark(s) together in the media 103, and/or the like.

The blockchain(s) 123 can be any type of blockchain 123, such as a single blockchain 123, a branched blockchain 123, and/or the like. The blockchain(s) 123 may comprise multiple blockchains 123 that are used to track individual media 103 and/or copies of the media 103. Although not shown in FIG. 1, the blockchain(s) 123 may be a single individual blockchain(s) 123 or the blockchain(s) 123 may be part of a distributed ledger where the blockchain(s) 123 are copied to multiple servers/devices to replicate the blockchain(s) 123 to make the data about the media 103 in the blockchain(s) 123 highly immutable.

Figure 2:
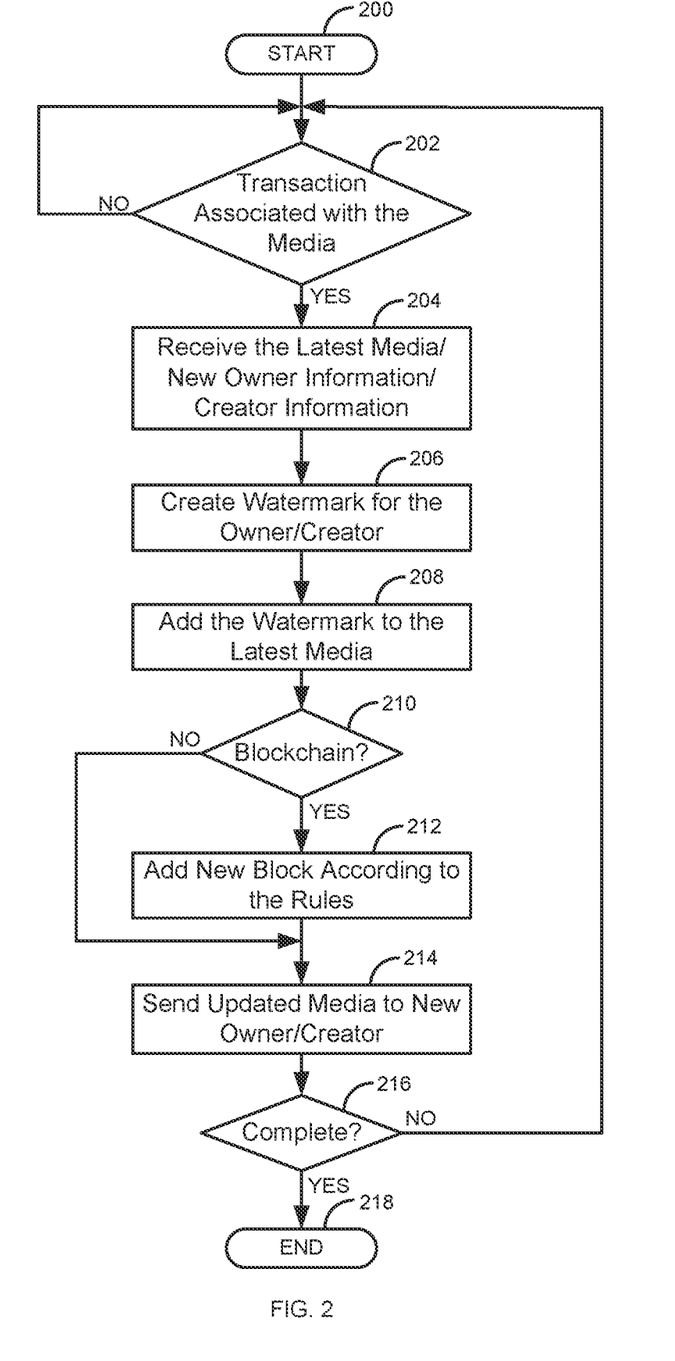
FIG. 2 is a flow diagram of a process for using watermark(s) and a blockchain to track ownership of media.

FIG. 2 is a flow diagram of a process for using watermark(s) and a blockchain 123 to track ownership of the media 103. Illustratively, the communication devices 101A-101N, the media controllers 102A-102N, the media server 120, and the media manager 121 are stored-program-controlled entities, such as a computer or microprocessor, which performs the methods of FIGS. 2-7 and the processes described herein by executing program instructions stored in a computer readable storage medium, such as a memory (i.e., a computer memory, a hard disk, and/or the like). Although the methods described in FIGS. 2-7 are shown in a specific order, one of skill in the art would recognize that the steps in FIGS. 2-7 may be implemented in different orders and/or be implemented in a multi-threaded environment. Moreover, various steps may be omitted or added based on implementation.

The process starts in step 200. The media manager 121 determines, in step 202, if a transaction associated with the media 103 has occurred. A transaction associated with the media 103 may include various events, such as creation of the media 103, a change of ownership of the media 103 (e.g., a sale or transfer), a change of media rights of the media 103, creation of a copy of the media 103, and/or the like. For example, the owner of the media 103A may want to sell the media 103A to the owner of the communication device 101N. In this example, the media controller 102A may send a notification of the transaction (the sale of the media 103A) to the media manager 121 in step 204. The notification may include information about the new owner, attributes about the media 103A, information about the previous owner of the media 103A, and/or the like. For example, the information about the new owner may include the new owner's name, address, date sold to the new owner and/or other identification information. If the transaction of step 202 is creation of the media 103, the owner will be the creator of the media 103. The creator of the media 103 may be an individual, a corporation, a group, and/or the like.

The media manager 121 receives the latest media 103 in step 204. For example, if the user of the communication device 101A is the current owner of the media 103A, the latest media 103A may be sent by the media controller 102A to the media manager 121 in step 204. The media manager 121 receives the latest media 103A and the new owner/creator information in step 204. This may include authenticating the current owner/creator using credentials (e.g., username/password, fingerprints scans, digital certificate, etc.). Receiving the latest media 103 may come from a communication device 101 or from a locally stored copy of the latest media 103 on the media server 120. The media manager 121 creates a watermark for the new owner/creator in step 206. The media manager 121 may create the watermark for the new owner/creator in various ways. For example, the watermark may be generated from a hash of the new owner's information.

The media manager 121 adds the watermark to the latest media 103 in step 208. The adding of the watermark to the latest media 103 in step 208 may occur in various ways. For example, an existing watermark may be overwritten by the watermark created in step 208 (where there is always a single watermark in the media 103), the watermark may be added into a new location within the media 103, an existing watermark may be moved and a new watermark may be added, and/or the like.

Where the watermark is added in the media 103 in step 208 may vary based on implementation. For example, each watermark in the chain-of-title may be in a fixed location. The first watermark may be in location A, the second watermark in location B, and so on. If there is only a single watermark/watermark location, the same location may be used each time to identify the current owner of the media 103 by overwriting the previous watermark.

The watermark(s) may use unused colors, may replace the least significant bits in specific locations, may be placed in less obvious locations, may be placed in least significant bits in an audio stream, may be based on a generated a random number to identify where the watermark will be placed, may use the owner's name to generate the locations (e.g., use a generated hash of the user's name to generate the locations), or any existing watermark technique. If this process is used for software, the watermark may be added to an image/logo, added on a web page (e.g., in a window), in any graphical object, in an audio file associated with the software, and/or the like.

The media manager 121 determines, in step 210, if there is an associated blockchain 123. If there is not an associated blockchain 123 in step 210, the process goes to step 214. Otherwise, if there is an associated blockchain 123 in step 210, the media manager 121 adds a new block to the blockchain 123 according to the rules. The rules may be predefined and/or dynamic based on implementation. The media manager 121 sends, in step 214, the updated media 103 with the new watermark to the new owner/creator (e.g., at the communication device 101N).

The media manager 121 determines, in step 216, if the process is complete. If the process is not complete in step 216, the process goes back to step 202. Otherwise, if the process is complete in step 216, the process ends in step 218.

Figure 3:
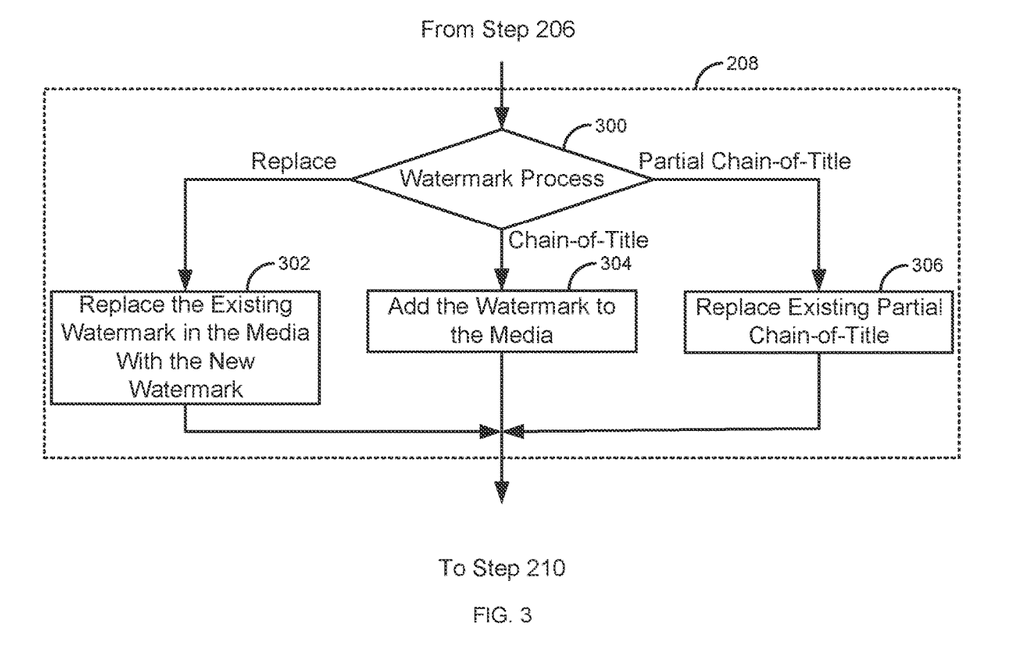
FIG. 3 is a flow diagram of a process for determining how to place watermarks into media.

FIG. 3 is a flow diagram of a process for determining how to place watermarks into media 103. FIG. 3 is an illustrative embodiment of step 208 of FIG. 2. After creating the watermark for the owner/creator in step 206, the media manager 121 determines what watermark process is being used in step 300. The particular watermark process being used may be based on a user administration, predefined rules/software configuration, and/or the like. In one embodiment, different ways of placing the watermark into the media 103 may vary based on different parameters, such as, the media type, an owner's preference, an administration, a size of the media 103, and/or the like. For example, the owner may want to use a chain of title process for a first media 103 and a replace process for a second media 103. In other words, the owner may determine what type of watermarking process will be used for each individual media 103/copy of the media 103.

The first option of step 300 is to replace the existing watermark. In this embodiment, the watermark resides in a single fixed location in the media 103. Each time the ownership changes, the existing watermark is replaced with the new watermark (generated in step 206) indicating the new owner. If it is the first time, the watermark will be the creator's watermark. If the system is configured to replace the existing watermark in step 300, the media manager 121 replaces the existing watermark in the media 103 with the new watermark in step 302. The process then goes to step 210.

The second option in step 300 is for a full chain-of-title. The full chain-of-title is where there is an initial creator watermark, and then watermarks for each owner of the media 103. In one embodiment, the watermarks for the creator/each owner are in fixed locations within the media 103. Alternatively, the fixed locations of the watermarks may vary based on the media 103 (e.g., the content of the media 103), rules, and/or implementation. If this option is being used, the additional watermark is added to the media 103 in step 304 and the process goes to step 210.

A Third alternative is to limit the number of watermarks in the media 103 to the current owner, +previous owner or alternatively current/previous/previous+1, (or some limited number of previous owners). This process could also use the same blockchain structure. If a partial chain of title option is selected in step 300, the partial chain of title is updated. For example, if there are two watermarks and the two watermarks have the previous owner watermark and a current owner watermark, the current owner watermark is moved to the previous owner watermark, and the current owner watermark is updated to the watermark of the new owner in step 306. An alternative embodiment of the partial chain of title embodiment of step 306 and have the creator watermark and the current owner watermark in step 306. In other words, the creator watermark is always the same and the current owner is replaced. The process then goes to step 210.

Figure 4:
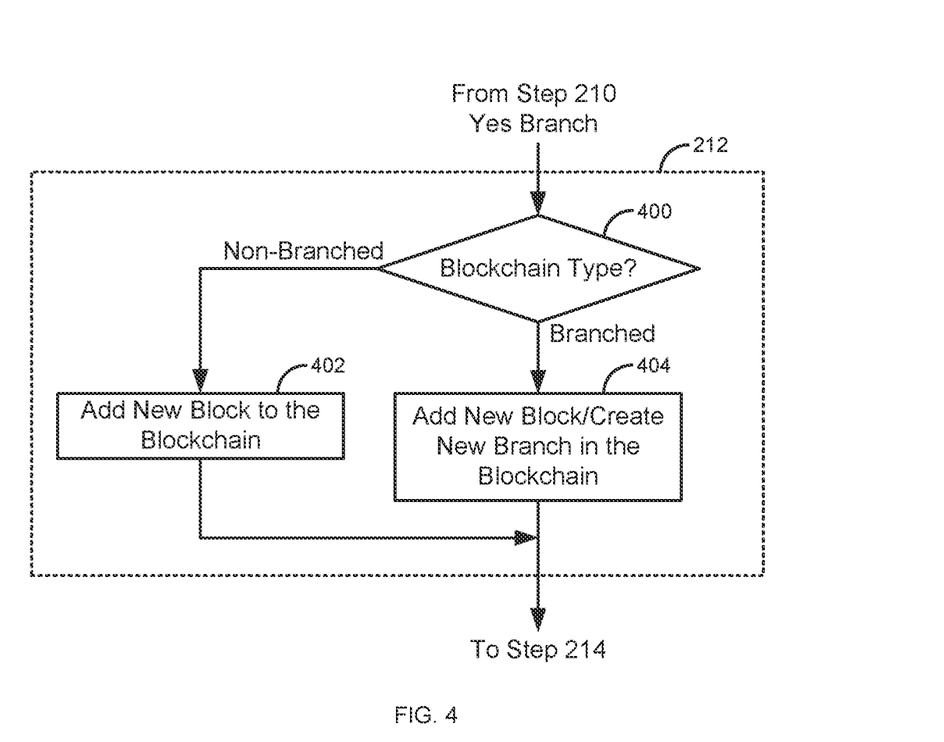
FIG. 4 is flow diagram of a process for adding blocks to a blockchain according to rules.

FIG. 4 is a flow diagram of a process for adding blocks to a blockchain 123 according to rules. FIG. 4 is an exemplary embodiment of step 212 of FIG. 2. After determining that a blockchain 123 is used in step 210, the media manager 121 determines the type of blockchain in step 400 that will be or is currently used. If the blockchain type is a non-branched blockchain 123 (e.g., as described in FIG. 5), the new block is added at the end of the blockchain 123 (or the blockchain 123 is created if it is the first time), and the process goes to step 214. Otherwise, if the blockchain type is a branched blockchain 123, the media manager 121 adds the new block (could be in a new branch based on rules or creates the blockchain 123 if it is the first time) to a branch in the blockchain 123 (e.g., as described in FIG. 6) and the process goes to step 214.

Figure 5:
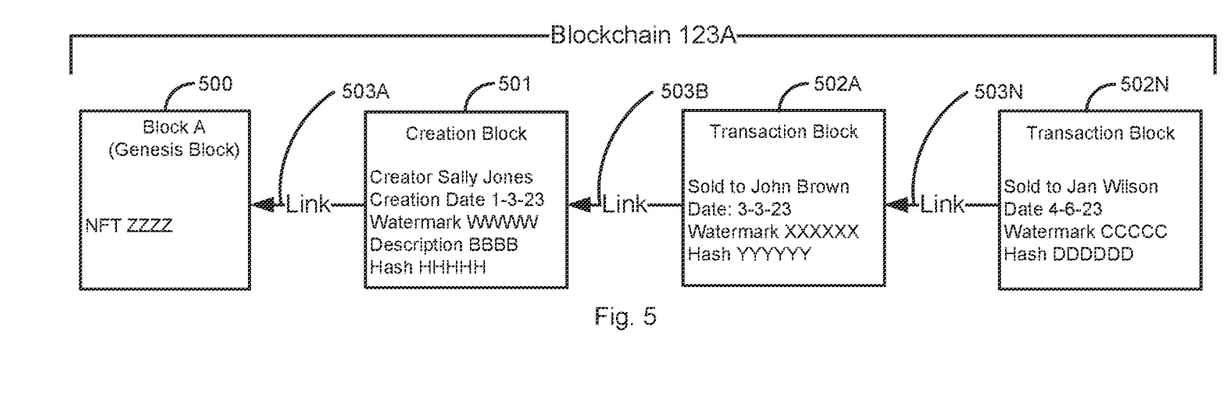
FIG. 5 is a diagram of a blockchain for tracking ownership of media.

FIG. 5 is a diagram of a blockchain 123A for tracking ownership of media 103. If this type of blockchain 123A is used. If there are separate copies of the media 103, each copy of the media 103 is tracked in a separate blockchain 123A. The blockchain 123A of FIG. 5 comprises a genesis block 500, a creation block 501, and transaction blocks 502A-502N. The genesis block 500, the creation block 501, and the transaction blocks 502A-502N are linked together by forward links 503A-503N. The links 503A-503N are links of hashes that are stored in the blocks 501/502A-502N to validate the blocks 501/502A-502N are valid.

When the creator of the media 103 is ready to track the chain of title, the blockchain 123A is created by adding the genesis block 500 and the creation block that are linked together by the forward link 503A as is traditionally done in blockchains 123. The genesis block 500 identifies the media 103. In this example, the media 103 is a Non-Fungible Token (NFT) named ZZZZ. The creation block 501 identifies the creator (Sally Jones) of the media 103, the creation date Jan. 3, 2023, the watermark WWWW, a description of the media (BBBB) and a hash of the media 103 including the watermark. In one embodiment, the genesis block 500 may also be the creation block 501. In other words, instead of a genesis block 500 and a creation block 501, there is a single genesis/creation block.

As the media 103 (NFT ZZZZ) gets sold/transferred, the transaction blocks 502 are added to the blockchain 123A for each sale/transfer. For example, when the media 103 (NFT ZZZZ) is first sold by the creator Sally Jones to John Brown, the transaction block 502A and link 503B are added to the blockchain 123A. In this example, the transaction block 502A identifies the new owner (John Brown), the date sold (3-3-2023), the watermark XXXXXX (the watermark associated with John Brown), and a hash of the media 103 with the watermark of John Brown. Likewise, when John Brown sells the media 103 (NFT ZZZZ) to Jan Wilson, the transaction block 502N/forward link 503N are added to the blockchain 123A. In this example, the transaction block 502N includes the new owner (Jan Wilson), the date of the sale (Apr. 6, 2023), the watermark associated with Jan Wilson CCCCC, and a hash of the media 103 with the new watermark of Jan Wilson DDDDDD. This process is repeated for each sale/transfer of the media 103.

The hash in a transaction block covers the media 103 that includes the watermark(s) regardless of the watermark process used (e.g., as described in FIG. 3). For example, if there is always a single watermark (e.g., as described in step 302 of FIG. 3), the hash includes the media 103 with the single watermark. If a new watermark is added for each transaction/creation (step 304), the hash will be over the media 103 with all the watermarks. Likewise, the hash will cover the watermarks for the partial chain of title (step 306) and the media 103. Because the hash that covers the watermark(s), if the watermark(s) is changed, a check of the hash would fail when determining if the media 103 has been tampered with.

Figure 6:
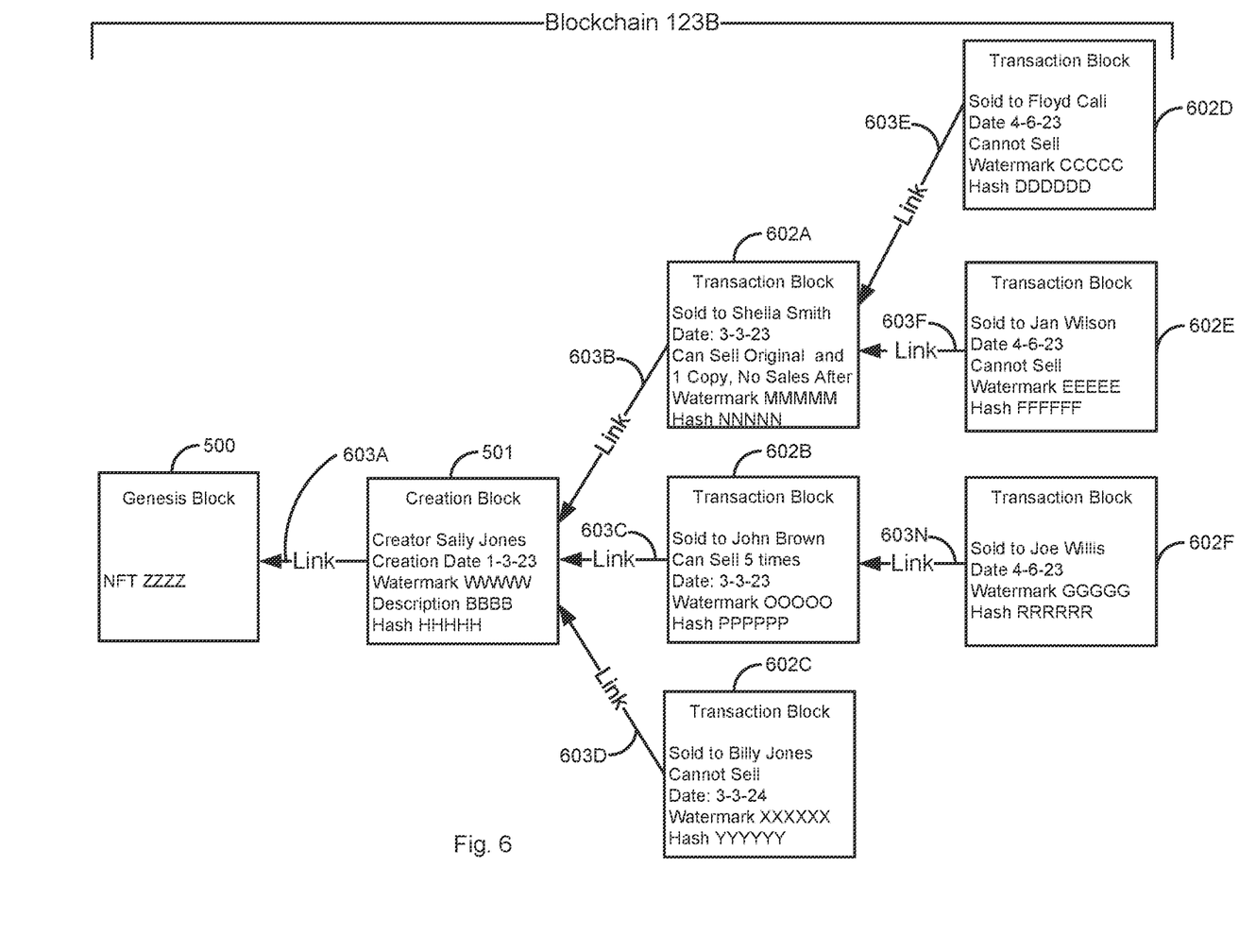
FIG. 6 is a diagram of a branched blockchain for tracking ownership of media.

FIG. 6 is a diagram of a branched blockchain 123B for tracking ownership of media 103. The branched blockchain 123B is used to track media 103 where there are multiple copies of the same media 103.

The branched blockchain 123B comprises the genesis block 500, the creation block 501, and transaction blocks 602A-602F. The branched blockchain 123B is linked together by forward links 603N (similar to the links 503A-503N). When the creator of the media 103 is ready to track the chain of title, the branched blockchain 123B (a chain of title blockchain 123) is created by adding the genesis block 500 and the creation block 502 that are linked together by the forward link 603A. The genesis block 500 identifies the media 103. In this example, the media 103 is the Non-Fungible Token (NFT) named ZZZZ. The creation block 501 identifies the creator (Sally Jones), the creation date Jan. 3, 2023, the watermark WWWW, a description of the media BBBB, and a hash of the media 103 including the watermark HHHHH. In one embodiment, the genesis block 500 may also be the creation block 501.

When multiple copies of the media 103 (NFT ZZZZ) are created and sold/exchanged a new branch in the branched blockchain 123B is created. For example, Sally Jones sold a copy of the media 103 (NFT ZZZZ) to Shella Smith and the transaction block 602A is added to the branched blockchain 123B. The transaction block 602A links to the creation block 501 via link 603B. The transaction block 602A has the new owner (Shella Smith), the date sold (Mar. 3, 2023), an indicator that says Shella Smith can sell her copy and make one other copy to sell. The transaction block 602A also indicates that no other sales can be made after Shella Smith sells her copy and the new copy. The transaction block 602A also includes the watermark MMMMM for Shella Smith and a hash of the media 103 with the watermark(s).

Shella Smith sells her copy and the additional copy. This causes the transaction blocks 602D and 603E to be added in different branches in the branched blockchain 123B. The transaction block 602D is linked to the transaction block 602A via forward link 603E. Likewise, the transaction block 602E is linked to the transaction block 602A via forward link 603F. The transaction block 602D indicates that the new and final owner (cannot sell) of the media 103 (NFT ZZZZ) is Floyd Cali, it was sold on Apr. 6, 2023, has the watermark CCCCC, and a hash of DDDDDD. The transaction block 602E indicates that the new and final owner (cannot sell) of the media 103 (NFT ZZZZ) is Jan Wilson, it was sold on Apr. 6, 2023, has the watermark EEEEE, and a hash of FFFFFF.

The creator, Sally Jones, sells another copy of the media 103 (NFT ZZZZ) to John Brown. This causes the creation of the transaction block 602B. The transaction block 602B is linked to the creation block 501 via forward link 603C. The transaction block 602B indicates that the new owner is John Brown, that John Brown can sell five copies of the media 103 (e.g., John Brown is a dealer of NFTs), that the media 103 (NFT ZZZZ) was sold to John Brown on Mar. 3, 2023, has a watermark of OOOOO, and a hash of PPPPPP.

John Brown sold a copy of the media 103 (NFT ZZZZ) to Joe Willis on Apr. 6, 2023, this copy of the media 103 has the watermark GGGGG, and a hash of RRRRRR. This causes the transaction block 602F to be added to the branched blockchain 123B. The transaction block 602F is linked to the transaction block 602B via the forward link 603N. In this example, John Brown can sell four more copies at a later date.

Sally Jones also sold a copy of the media 103 (NFT ZZZZ) to Billy Jones. This causes the transaction block 602C to be added to the branched blockchain 123B. The transaction block 602C links to the creation block 501 via forward link 603D. The transaction block 602C indicates that Billy Jones is the new owner, that Billy Jones cannot sell his copy of the media 103 (NFT ZZZZ), that the media 103 (NFT ZZZZ) was sold on Mar. 3, 2024, has a watermark of XXXXXX and a hash of YYYYYY.

For the transaction blocks 602A-602N, if the media 103 has a full chain of title, each copy of the media 103 (NFT ZZZZ) will have watermarks that show the chain of title back to the creator. For example, the copy of the media 103 (NFT ZZZZ) sold to Floyd Cali (represented by transaction block 602D) will have the watermarks of Floyd Cali (CCCCC), Shella Smith (MMMMM), and Sally Jones (WWWWW). If there is only a single watermark, then the watermark this copy of the media 103 will be the current owner. If there is a partial chain of title, the watermarks of the partial chain of title will be in the copy of the media 103 (NFT ZZZZ) owned by Floyd Cali.

If an unauthorized copy is in circulation, the process can tell if it is an unauthorized copy by looking at who is the current owner (the last owner to store a transaction) in the blockchain 123. If the blockchain 123 shows that user A now owns it, but the watermark shows that user B is the current owner, you can flag this version as an unauthorized version that came from the copy that user B once owned.

In addition, the blockchain 123 may have additional data of what copyrights each copy has. For example, a first purchaser may receive the right to play the media 103 x number of times and purchaser 2 may be able to play an unlimited number of times or for a period of time. The rights could only allow sales to specific persons or groups (e.g., a person's family). In other words, the blockchain 123 may track reproduction, adaptation, publication, performance, and display rights (those covered under copyright law).

In one embodiment, the blockchain 123 may be the source of validity. For example, the user may have to present their watermark to the blockchain 123 in order to be able to use their media 103. This may be accomplished where the user presents a digital certificate that then allows the user to access/user the media 103.

In addition, the process could be tied to edition size. For example, if the edition is only twenty copies. The blockchain 123 can track the media 103 to indicate that a specific user has copy six of the total twenty copies. In this example, the blockchain 123 will only allow the creator to sell twenty copies of the media 103.

Figure 7:
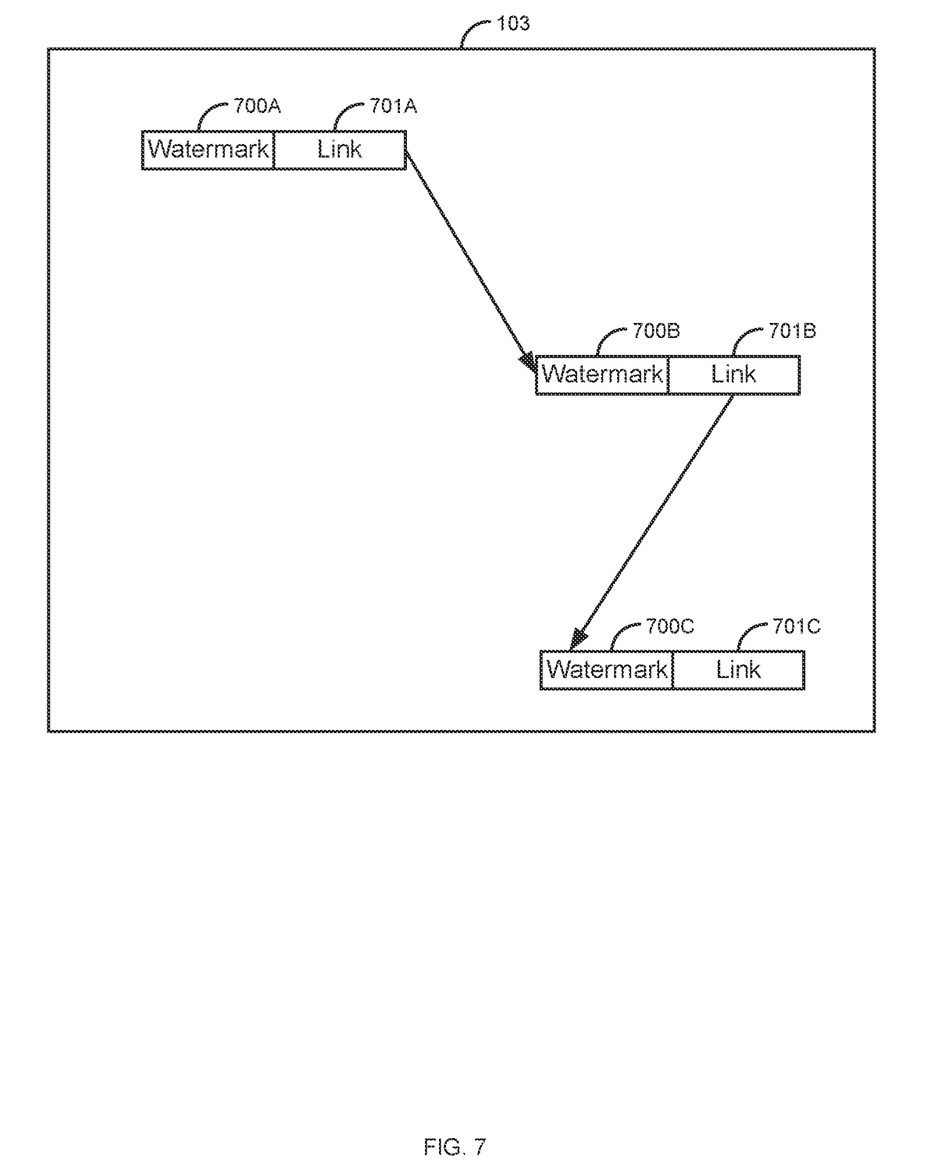
FIG. 7 is a diagram of how watermarks are linked in media.

FIG. 7 is a diagram of how watermarks 700 are linked in media 103. FIG. 7 illustrates an embodiment of where watermarks 700 may be in different locations within the media 103 for different copies/types by using links/rules. In this example, media 103 has watermarks 700A-700C and links 701A-701C. In this example, the watermark 700A is in a fixed location. The locations of the watermarks 700B-700C may vary for each of the copies of the media 103 based on rules. For example, the locations of the watermarks may be randomized to further disguise the use of watermarks 700 within each copy of the media 103. Thus, each copy will have watermarks 700 at different locations (other than the creator watermark).

In this example, the watermark 700A is the creator watermark 700A. The creator watermark 700A has a link 701A to the first owner watermark 700B. The first owner watermark 700B has a link 701B to the second owner watermark 700C. In this example, the second owner is the current owner. The link 701C will be used if the media 103 is sold/transferred to a third owner.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® is-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
   a microprocessor; and
   a computer readable medium, coupled with the microprocessor and comprising microprocessor readable and executable instructions that, when executed by the microprocessor, cause the microprocessor to:
   generate a watermark, wherein the watermark is specific to an individual owner; and
   insert the watermark into a media, wherein the watermark in the media is changed when ownership of the media is changed; and
   wherein the watermark in the media comprises a plurality of watermarks that comprise a chain-of-title for the media, wherein each of the plurality of watermarks identifies one of a creator, a previous owner, or a current owner, and wherein each of the plurality of watermarks are stored in different locations in the media; and
   wherein the plurality of watermarks further comprises one or more links to link the plurality of watermarks together to form the chain-of-title in the media.

2. The system of claim 1, wherein each of the plurality of watermarks are stored in separate blocks in a chain-of-title blockchain.

3. The system of claim 2, wherein each of the separate blocks in the chain-of-title blockchain further comprise a hash of the media and/or watermark when the media was created or sold to the current owner.

4. The system of claim 3, wherein the chain-of-title blockchain tracks a maximum number of copies.

5. The system of claim 3, wherein a transaction block in the chain chain-of-title blockchain identifies a number of times a copy of the media can be sold/transferred.

6. The system of claim 2, wherein the chain-of-title blockchain comprises a plurality of branches that individually track individual copies of the media and ownership of the individual copies of the media.

7. The system of claim 6, wherein the plurality of branches track individual media rights for each of the individual copies of the media.

8. The system of claim 1, wherein the plurality of watermarks are stored in fixed locations within the media.

9. The system of claim 1, wherein the watermark is a partial chain of title watermark.

10. A method comprising:
    generating, by a microprocessor, a watermark, wherein the watermark is specific to an individual owner; and
    inserting, by the microprocessor, the watermark into a media, wherein the watermark in the media is changed when ownership of the media is changed; and
    wherein the watermark in the media comprises a plurality of watermarks that comprise a chain-of-title for the media, wherein each of the plurality of watermarks identifies one of a creator, a previous owner, or a current owner, and wherein each of the plurality of watermarks are stored in different locations in the media;
    wherein each of the plurality of watermarks are stored in separate blocks in a chain-of-title blockchain; and
    wherein the chain-of-title blockchain comprises a plurality of branches that individually track individual copies of the media and ownership of the individual copies of the media.

11. The method of claim 10, wherein a transaction block in the chain-of-title blockchain identifies a number of times a copy of the media can be sold/transferred.

12. The method of claim 10, wherein the plurality of watermarks further comprises one or more links to link the plurality of watermarks together to form the chain-of-title in the media.

13. The method of claim 10, wherein the plurality of watermarks are stored in fixed locations within the media.

14. The method of claim 10, wherein the watermark is a partial chain of title watermark.

15. A non-transitory computer readable medium having stored thereon instructions that cause a microprocessor to execute a method, the method comprising instructions to:
    generate a watermark, wherein the watermark is specific to an individual owner; and
    insert the watermark into a media, wherein the watermark in the media is changed when ownership of the media is changed; and
    wherein the watermark in the media comprises a plurality of watermarks that comprise a chain-of-title for the media, wherein each of the plurality of watermarks identifies one of a creator, a previous owner, or a current owner, and wherein each of the plurality of watermarks are stored in different locations in the media; and
    wherein the plurality of watermarks further comprises one or more links to link the plurality of watermarks together to form the chain-of-title in the media.

16. The non-transitory computer readable medium of claim 15, wherein each of the plurality of watermarks are stored in separate blocks in a chain-of-title blockchain.

17. The non-transitory computer readable medium of claim 16, wherein each of the separate blocks in the chain-of-title blockchain further comprise a hash of the media and/or watermark when the media was created or sold to the current owner.

18. The non-transitory computer readable medium of claim 16, wherein the chain-of-title blockchain comprises a plurality of branches that individually track individual copies of the media and ownership of the individual copies of the media.

19. The non-transitory computer readable medium of claim 18, wherein the plurality of branches track individual media rights for each of the individual copies of the media.

20. The non-transitory computer readable medium of claim 18, wherein the chain-of-title blockchain tracks a maximum number of copies.

* * * * *